United States Patent Office 3,328,912
Patented July 4, 1967

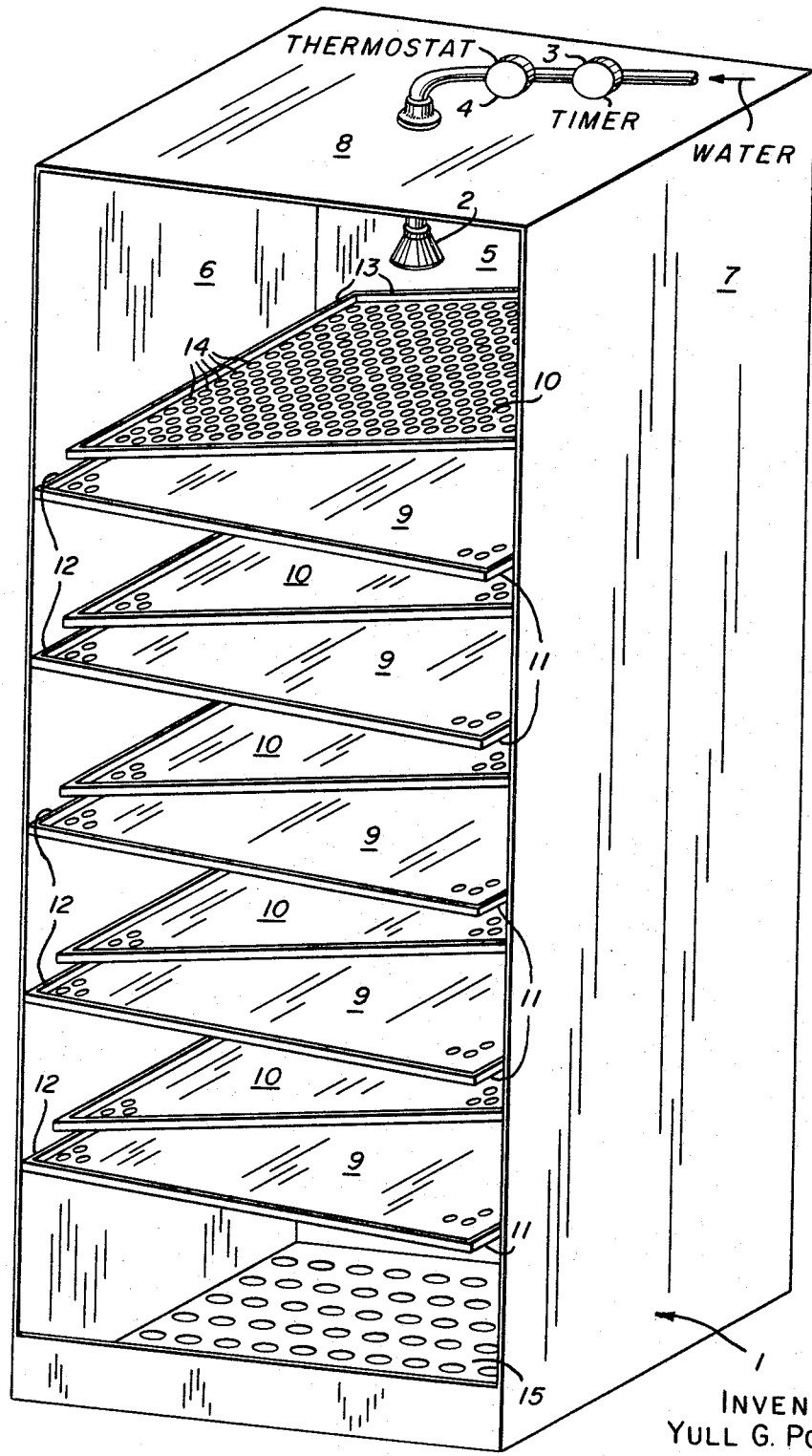

3,328,912
PROCESS AND APPARATUS FOR GROWING BEAN SPROUTS
Yull Gunn Poon, 204 Centre St., Calgary, Alberta, Canada
Filed May 21, 1965, Ser. No. 457,770
2 Claims. (Cl. 47—1.2)

This invention relates to a process of and apparatus for growing and preparing bean sprouts as used in the meals served in so-called "Chinese" restaurants, which are so popular in North America.

Normally, bean sprouts take from five to seven days to grow to the state where they can be used but I have invented a process and apparatus by which this time can be greatly reduced. Thus, according to my invention, the beans are placed in a receptacle on at least one perforated tray inclined to the horizontal and warm water is passed through the receptacle and in contact with the beans for relatively short periods, at relatively long intervals. For example, water between 60° and 100° F. may be passed through for 20 minutes every four hours for 2½ days to achieve the same result that normally takes 7 days. During this stage, the ambient temperature in the region of the receptacle may be kept between 80° and 100° F.

The receptacle is preferably a housing having a plurality of trays removably mounted therein, one shown above the other, to hold the beans. Preferably, the trays are in two series, with the trays of one series being attached at one end to one side wall of the housing and having their other ends spaced from the other side wall, while the trays of the other series are attached at one end to said other side wall and are spaced from said one side wall, all of the trays being inclined downwardly from their attached ends to their free ends and the trays of said two series alternating whereby a sinuous path is formed for water introduced at the top of the housing.

The trays are perforated to allow the roots to grow through the trays and be held in position for cutting when the trays are removed at the end of the growing cycle.

A particular embodiment of my invention will now be described, by way of example, with reference to the accompanying drawing, which is a front perspective view of a treatment receptacle with the front cover removed for the sake of illustration.

As shown the treatment receptacle 1 is supplied with water from any suitable source via a shower head 2, the supply and temperature of the water being controlled by a timer 3 and a thermostat 4, respectively. The timer and thermostat are of known types and thus have been illustrated schematically only.

The receptacle 1 is in the form of a vertically elongated housing having a back wall 5, side walls 6 and 7, a removable front cover (not shown), a top 8 and a perforated bottom 15 to allow the water to drain away from the housing. Removably mounted on side wall 6 is a series of five trays 9 and removably mounted on side wall 7 is a similar series of five trays 1, each of trays 9 extending downwardly towards side wall 7 to terminate in a free end 11, spaced two inches below fixed end 12 and two inches away from wall 7, and each of trays 10 being similarly inclined downwardly and spaced from side wall 6. The trays 9 and 10 alternate so that a sinuous path is formed for the water passing downward through the housing.

Each of trays 9 and 10 has an outstanding ¼ inch lip 13, whereby two layers of beans may be held in each tray. In addition, each tray has perforations 14 to allow the roots to penetrate and hold the plants in position for cutting when the trays are removed at the end of the growing cycle. The perforations should be about 1/32 of an inch in diameter and there should be no more than 1/16 of an inch between centres.

The thermostat is set to maintain the temperature of the water supplied to the housing at 100° F. and the timer is set to allow the water to flow for twenty minutes every four hours. After 2½ days, the trays may be removed.

After germination the husks are washed down automatically to the perforated bottom tray of the housing and this tray should be large enough to contain all the husks which will be brought down during the entire growing process, thus necessitating only one removal of the husk trap for each growing cycle. Thus, with the exception of the removal of the roots, the sprouts are ready for use.

The apparatus should be placed, for optimum results, in a room where the temperature never falls below 80° F.

It will be manifest that the cabinet capacity is variable, ranging upward from a cabinet holding one tray.

What I claim as my invention is:
1. Apparatus for growing bean sprouts comprising:
 (a) a receptacle having a pair of opposed side walls,
 (b) a first vertical series of perforated trays inclined downwardly from one side wall to terminate short of the other side wall,
 (c) said first series of trays being in close abutment to and removably supported by said one side wall and unsupported by said other side wall and forming a substantial gap between said other side wall so as to define a first series of passages for water and husks carried by said water,
 (d) a second vertical series of perforated trays in staggered relation with said first series of trays inclined downwardly from said other side wall to terminate short of said one side wall,
 (e) said second series of trays being in close abutment to and removably supported by said other side wall and supported by said one side wall and forming a substantial gap with said one side wall so as to define a second series of passages for water and husks carried by said water,
 (f) said first and second series of passages defining a sinuous path for water introduced at the top of said receptacle,
 (g) said perforations in said trays being of a size to allow the roots of bean sprouts on the trays to grow therethrough so as to be readily severable at the end of a growing cycle,
 (h) inlet means for introducing warm water into the receptacle and into contact with beans on said trays,
 (i) outlet means for allowing the warm water to leave the receptacle after contacting the beans,
 (j) means for controlling the temperature at which the water enters the receptacle, and
 (k) means for controlling the length of time during which and the frequency at which warm water is supplied to said inlet means.
2. Apparatus as in claim 1 and wherein:
 (a) said trays have very short upstanding lips so as to permit the husks to be flushed thereover upon rinsing operation, and
 (b) a flat bottom tray for receiving said husks.

References Cited
UNITED STATES PATENTS

| | | | |
|---|---|---|---|
| 2,121,461 | 6/1938 | Widmann | 47—1.2 |
| 2,522,798 | 9/1950 | Persha et al. | 47—14 |
| 3,141,263 | 7/1964 | Wang | 47—14 |

ABRAHAM G. STONE, *Primary Examiner.*
ROBERT E. BAGWILL, *Examiner.*